Figure 1:
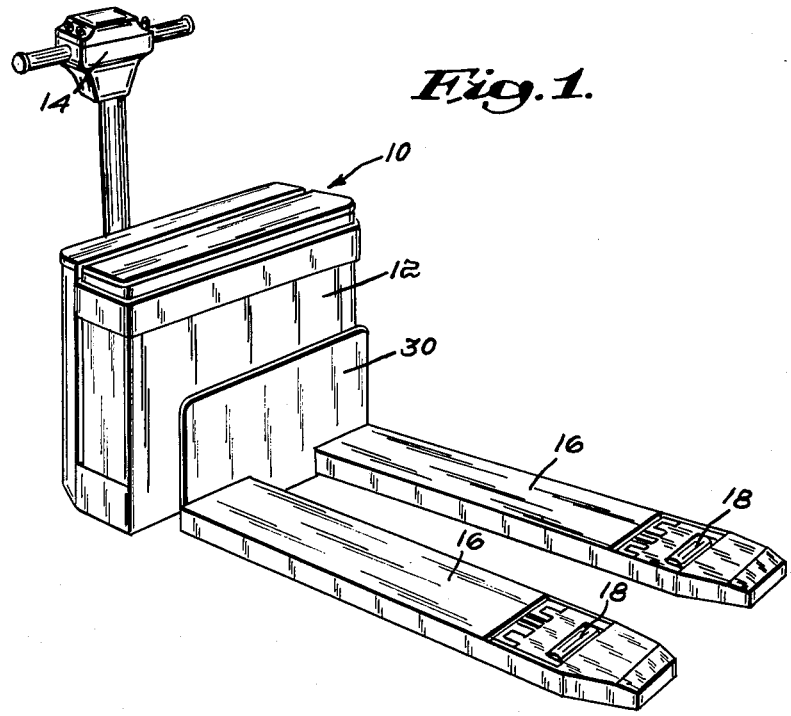

July 19, 1966   B. B. BECKER ETAL   3,261,617
MEANS FOR RAISING AND LOWERING PALLET FORK EXTENSIONS
Filed Jan. 8, 1964   6 Sheets-Sheet 1

Inventors:
Bernard B. Becker,
Francis W. Dorion,
by Russell, Chittick & Pfund
Attorneys July 19, 1966   B. B. BECKER ETAL   3,261,617
MEANS FOR RAISING AND LOWERING PALLET FORK EXTENSIONS
Filed Jan. 8, 1964   6 Sheets-Sheet 4

Inventors:
Bernard B. Becker,
Francis W. Dorion,
by Pennie, Chittick & Pfund
Attorneys July 19, 1966 B. B. BECKER ETAL 3,261,617
MEANS FOR RAISING AND LOWERING PALLET FORK EXTENSIONS
Filed Jan. 8, 1964 6 Sheets-Sheet 5

Inventors:
Bernard B. Becker,
Francis W. Dorion,
by Russell, Chittick & Pfund Attorneys

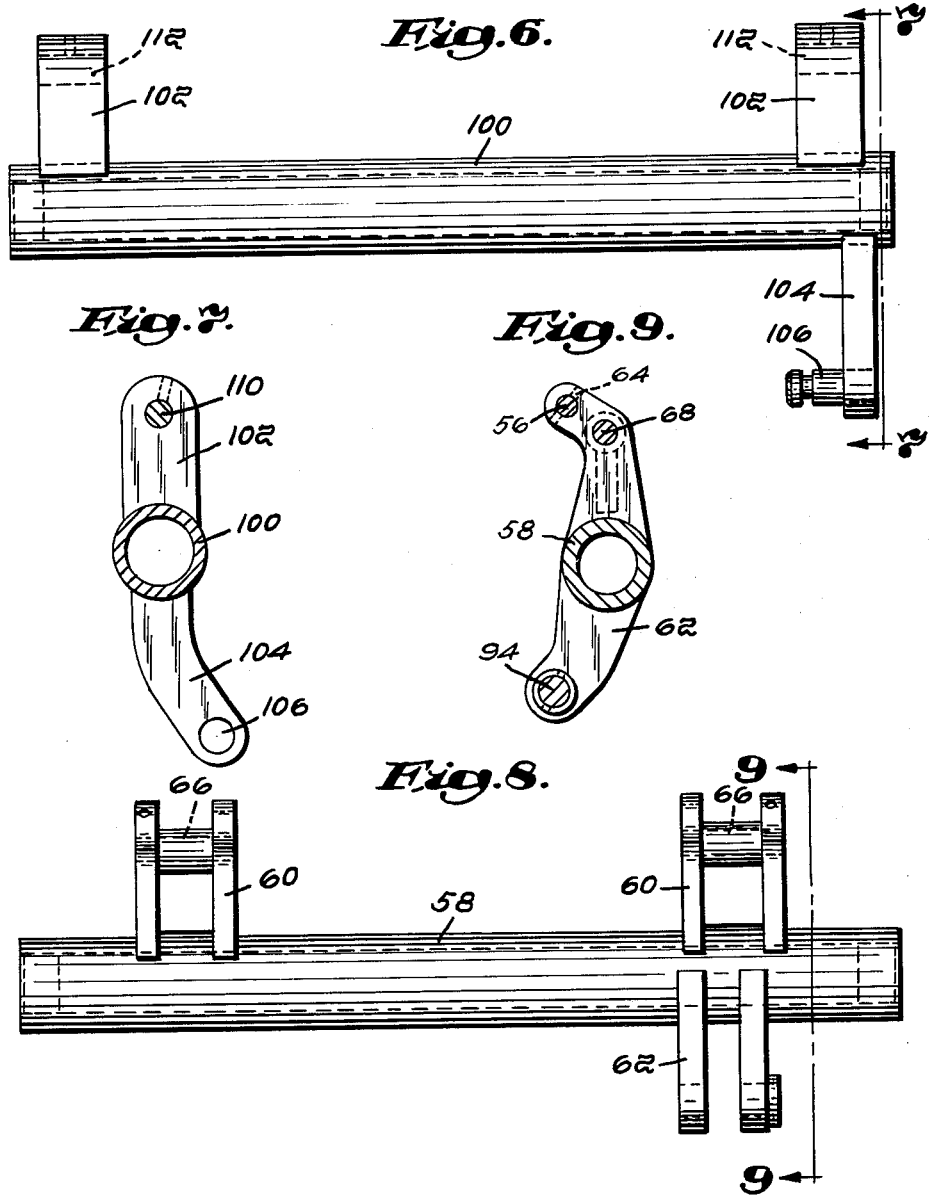

United States Patent Office 3,261,617
Patented July 19, 1966

3,261,617
MEANS FOR RAISING AND LOWERING PALLET FORK EXTENSIONS
Bernard B. Becker, Belmont, and Francis W. Dorion, South Boston, Mass., assignors to Lewis-Shepard Company, Watertown, Mass., a corporation of Massachusetts
Filed Jan. 8, 1964, Ser. No. 336,511
5 Claims. (Cl. 280—43.12)

This invention relates to means for raising and lowering the pallet fork extensions of a materials handling truck, and more particularly to a hydraulic linkage assembly for arcuately pivoting the rollers housed in the pallet fork extensions to cause the fork extensions to raise the palletized load clear of the floor.

This invention has particular application in materials handling trucks that are used to move palletized loads from one location to another. It is not intended to be used with trucks that must lift loads more than a few inches from the floor. The trucks of the class with which we are concerned include so-called "walkie" trucks which are controlled by an operator walking at the front of the truck. In use, the operator positions the truck adjacent a load that is secured to an open faced pallet and inserts the fork extensions within the pallet. The rollers in the fork extensions are then pivotally lowered which causes the fork extensions to horizontally rise and to thereby lift the palletized load from the floor a small distance (usually about four inches). The loaded truck can then be maneuvered to another location for unloading. At that point, the fork extension rollers are retracted into the fork extensions thereby lowering the fork extensions and palletized load to the floor after which the fork extensions are withdrawn from the open faced pallet. Such "walkie" trucks are generally used to quickly and economically move palletized loads over short distances, especially in closely confined areas, such as in narrow aisles or on loading docks.

In constructing a truck of the class described, it is highly desirable to reduce the physical dimensions of the truck to the smallest possible size while not compromising performance and safety requirements. A small truck is preferable because the truck normally operates in a confined area where it frequently must be turned around within its own length. Such a requirement causes great importance to be placed upon the positioning of the various components housed within the truck.

It is especially important to locate the operating components of the truck, as well as the enclosure therefor, within the truck turning radius so that they will not add to the overall length of the truck.

As previously noted, this invention concerns the hydraulic linkage assembly for downwardly pivoting the rollers housed in the pallet fork extensions. In previous constructions the rollers have been pivoted downwardly by means of two horizontal hydraulic rams which drive connecting rods longitudinally in the fork extension housings. This invention employs a single vertically disposed ram.

Furthermore, the return springs to retract the pivoted rollers have previously been contained in the fork extension housings, thereby being exposed to dirt and corrosion.

In accordance with the above, it is an object of this invention to provide an improved truck construction wherein a single hydraulic ram is employed for pivotally actuating the fork extensions rollers, said ram being positioned vertically in order not to contribute to the length of the truck.

It is another object of this invention to provide an improved truck construction wherein a single return spring is employed for pivotally retracting the fork extension rollers, said return spring being positioned vertically adjacent the hydraulic ram in order not to contribute to the length of the truck.

It is a further object of this invention to provide an improved truck construction wherein all of the operating components are mounted above the floor of the main housing so as to be readily accessible for maintenance and to be protected from dirt and corrosion. This arrangement permits maintenance to be performed without overturning the truck or utilizing a service pit.

Other objects and advantages of the invention will become apparent from a study of the accompanying drawings and descriptive matter in which is illustrated and described a preferred embodiment of the invention.

Figure 2:
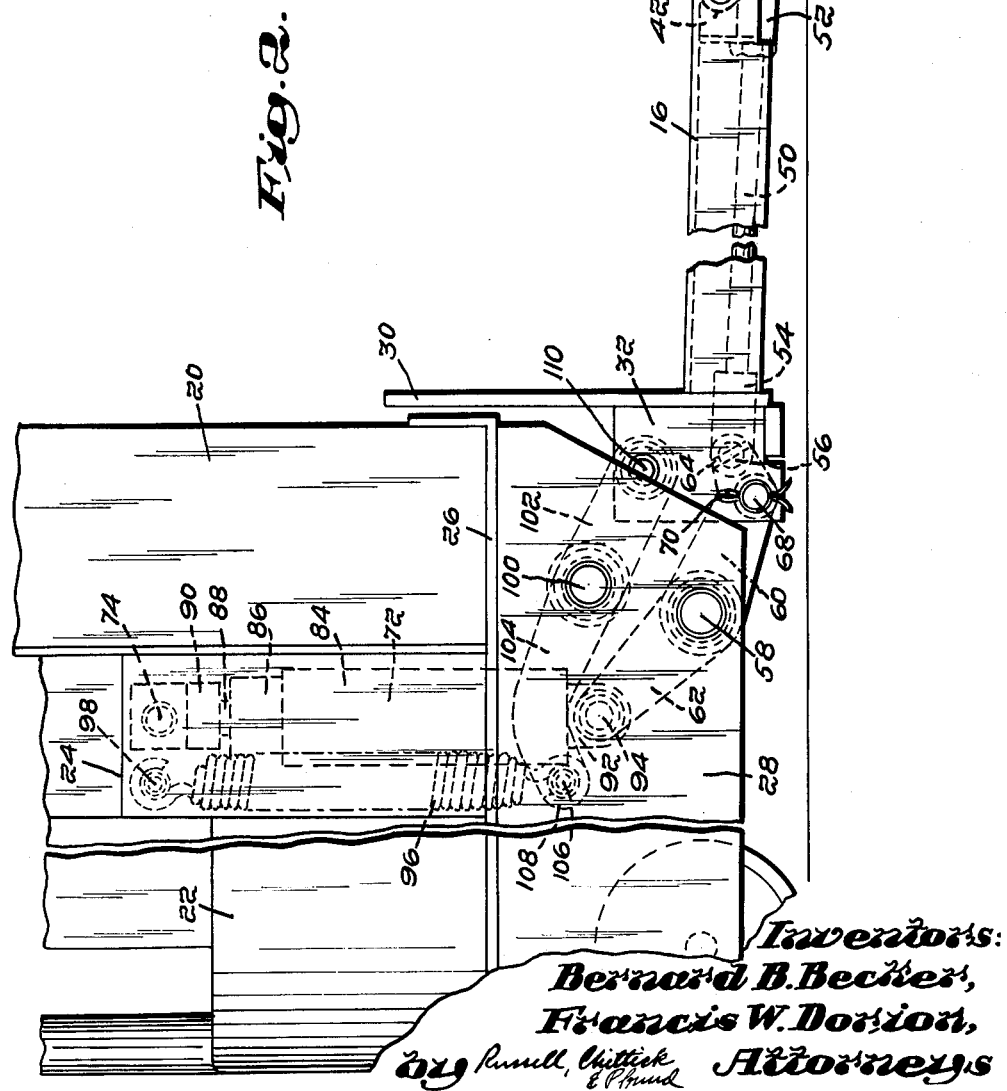
Figure 3:
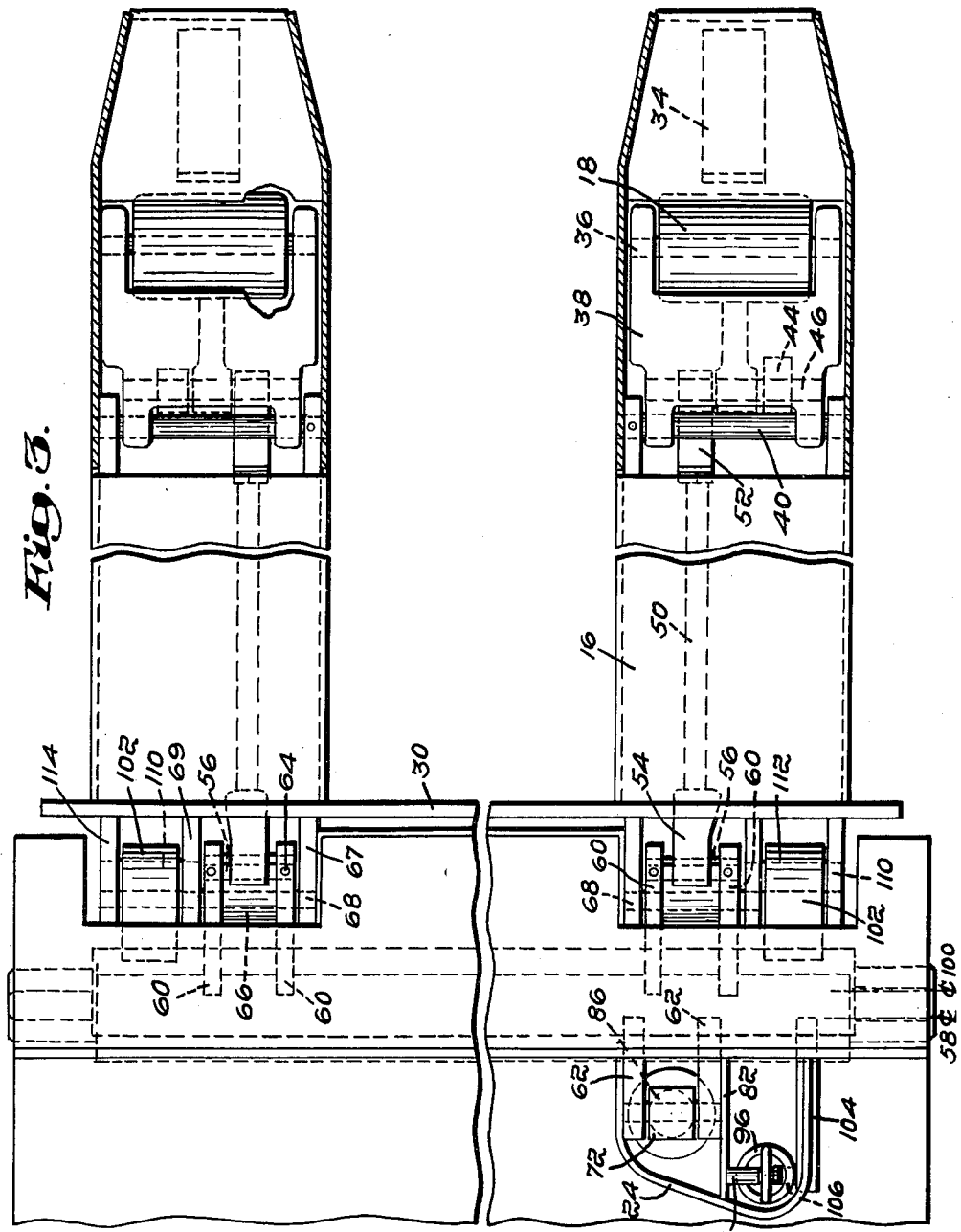
Figure 4:
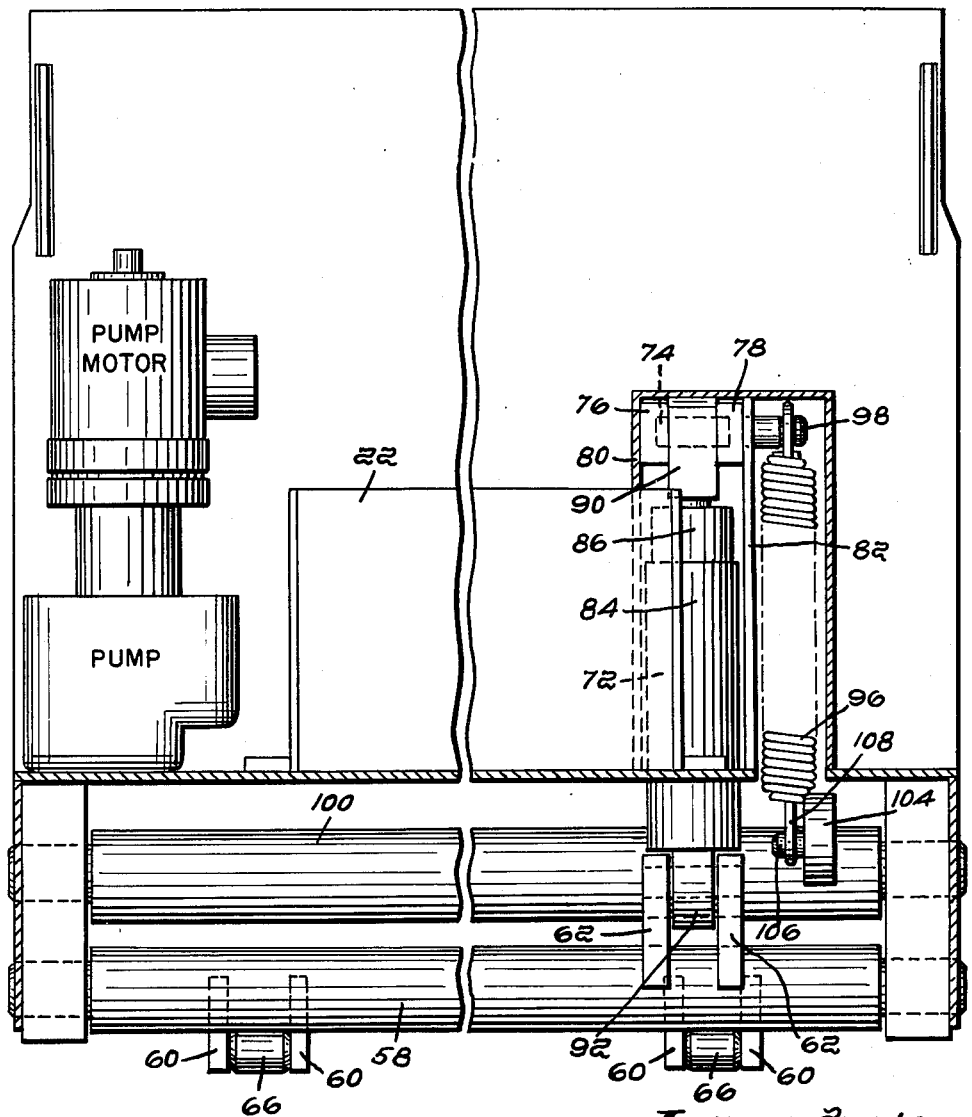
Figure 5:
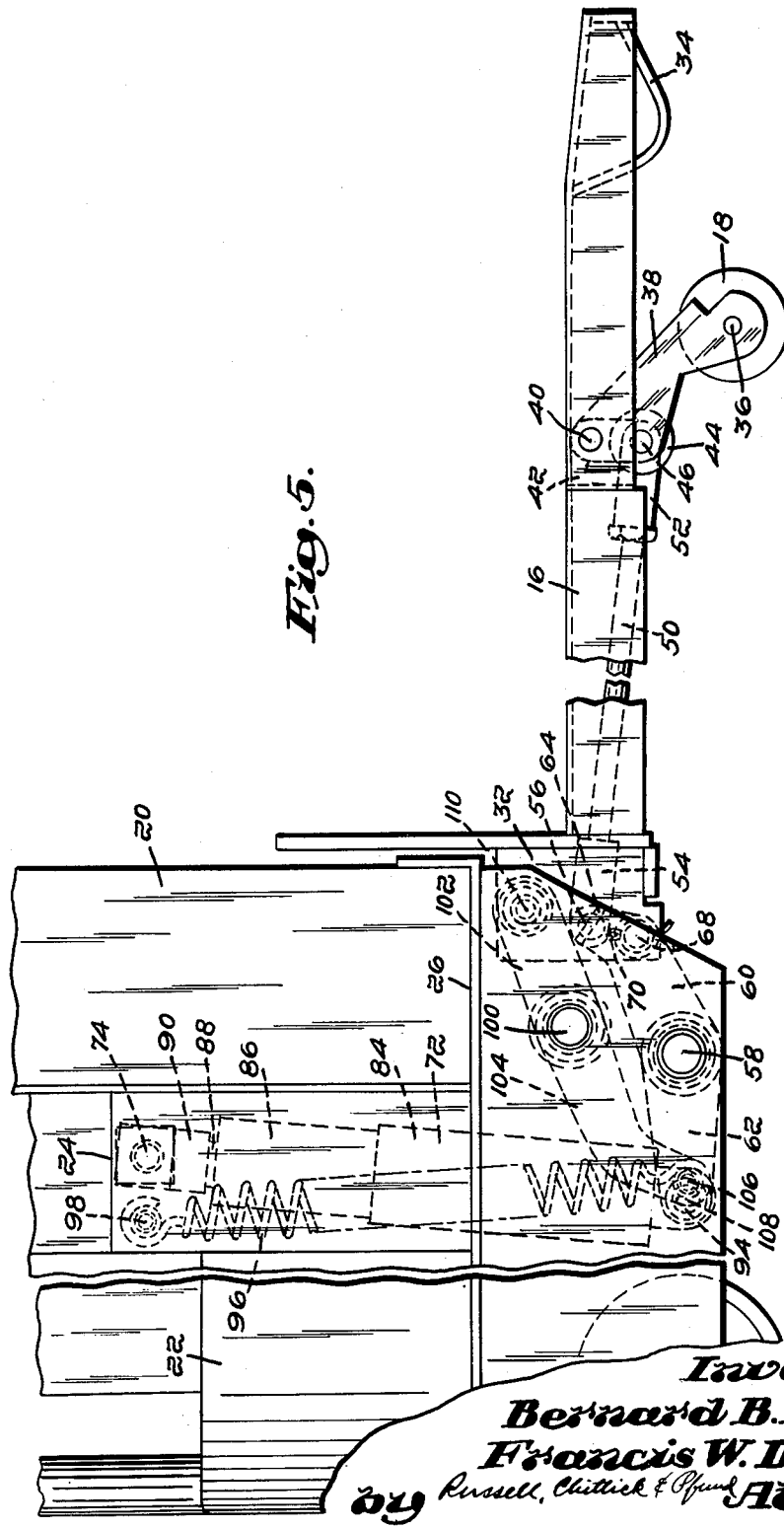

In the drawings:
FIG. 1 is a view in perspective of the pallet truck incorporating the invention;
FIG. 2 is a side elevation, partly broken away, of the pallet fork extensions and the mechanism for raising and lowering the extensions, wherein the fork rollers are in the retracted position;
FIG. 3 is a plan view, partly broken away, of the pallet fork extensions, showing the shafts and rods which cooperate with the mechanism for raising and lowering the extensions;
FIG. 4 is an front elevation, partly broken away, of the hydraulic ram and return spring mechanisms looking toward the fork extensions;
FIG. 5 is a side elevation, partly broken away, similar to FIG. 2, showing the fork rollers in the depressed position;
FIG. 6 is a plan view of the upper torque shaft and lever arm assembly which is revolved by actuation of the return spring;
FIG. 7 is a side sectional view of the upper torque shaft and lever arm assembly taken along line 7—7 of FIG. 6;
FIG. 8 is a plan view of the lower torque shaft and actuating arm assembly which is revolved by actuation of the hydraulic ram; and
FIG. 9 is a side sectional view of the lower torque shaft and actuating arm assembly taken along line 9—9 of FIG. 8.

Referring now more particularly to FIG. 1 of the drawings, the materials handling truck or pallet truck generally designated as 10 will be recognized as being conventional in several respects. The truck has a main housing 12 enclosing the lifting machinery, the batteries, and the other components necessary to operate the pallet truck. In the type of truck shown in FIG. 1, a single front-mounted driven steerable wheel is employed in combination with a pivoting swingable control handle 14 located at the front of the truck to provide maximum maneuverability therefor.

Extending to the rear of the truck is a pair of spaced apart fork extensions 16 which are specially shaped for insertion into open faced pallets and skid platforms. Fork rollers 18, which are recessed into the fork extension 16, provide rolling support for the fork extensions both when the forks are in the lowered position shown in FIG. 2 and when the forks are in the raised position shown in FIG. 5. Therefore, it will be seen that FIG. 1 illustrates a materials handling truck particularly designed for use with loads secured on open faced pallets in situations where it is desired to move such loads short distances in confined areas.

The construction of the truck as just described is well known in the art and the particular means by which the truck is driven and steered and controlled is conventional and does not in any way form a part of the present invention. Accordingly, it is not necessary to set forth the construction thereof in detail. It should be noted that the type of truck shown in FIG. 1 has been selected for illustrative purposes only and is not the only type of truck that can make use of the novel features incorporated in the hereafter described means for raising and lowering the fork extensions.

In FIG. 2, it will be seen that the main housing 12 includes a battery box 20 extending across the rear thereof, a traction drive enclosure 22 at the front of the housing and a hydraulic ram enclosure 24 located adjacent the battery box and traction drive enclosure. A base plate 26 forms a complete floor for the main housing 12 and extends from the front to the rear theerof. Disposed around the periphery of the base plate 26 and depending downwardly therefrom is a lower frame 28 which is rigidly affixed to the main housing 12.

The fork extensions 16 are constructed completely independent from the main housing 12 and the lower frame 28. Each extension has, at its free end, a guiding skid 34 which facilitates insertion of the fork extensions into the pallet opening. The extensions have side and top walls and are open at the bottom. It will be seen in FIGS. 2 and 3 that the fork extensions 16 are identical and spaced apart and are affixed to a stop plate 30 which is vertically disposed and extends between the two fork extensions. A pair of lifting frames 32 are rigidly attached to the forward side of the stop plate 30 and are positioned approximately opposite each fork extension 16.

The fork roller assembly will now be described in detail. Each fork extension 16 carries, in a cut-out portion thereof, a fork roller 18 which has a transverse axle 36. Axle 36 is mounted in a pivoting roller support bracket 38 which has bracket walls of considerable structural rigidity. The roller support bracket is pivoted on an axle 40 that is mounted in the vertical side walls of fork extension 16. It will thus be seen that the fork roller can be pivoted downwardly to the depressed position shown in FIG. 5 or pivoted to a level retracted position shown in FIG. 2. The roller support bracket 38 is rounded off at its upper forward edge 42 so that no portion of the bracket protrudes above the upper plane of the fork extension 16 regardless of the position of fork roller 18.

To facilitate the passage of the fork extensions 16 into the interior of the pallet, a small stabilizing wheel 44 is positioned forward of fork roller 18, on an axle 46, which is mounted in the roller support bracket 38. The longitudinal spacing of guiding skid 34, fork roller 18 and stabilizing wheel 44 is precisely arranged to prevent any portion of fork extension 16 from becoming entrapped in the spaces between the transverse slats of the pallet. It should be noted that a third wheel or roller could be located at the rear tip of the fork extension in place of the guiding skid 34 for the purpose of further aiding the fork extension insertion.

To pivot the fork roller 18 downwardly to the depressed position shown in FIG. 5, a connecting rod 50 is longitudinally disposed within each fork extension 16 and is connected to axle 46 by means of a rod cap 52 which is threadably secured to connecting rod 50 and is transversely bored and sleeved to accommodate axle 46. Longitudinal movement of connecting rod 50 will cause axle 46 to swing in a short arc thereby pivoting the entire fork roller assembly between the retracted position and the depressed position.

At the other end of connecting rod 50, a second rod cap 54 is threadably secured to the connecting rod and likewise transversely bored and sleeved to receive link pin 56. This completes the description of the major elements housed in each fork extension 16.

The hydraulic drive means for reciprocating the connecting rods 50 is housed in the hydraulic ram enclosure 24. The shafts and arms through which the driving motion is transmitted to the connecting rods 50 are carried within lower frame 28. In particular, lower torque shaft 58 (note center line indication in FIG. 3) extends entirely across the truck width and is journalled in the side walls of the lower frame 28. Lower torque shaft 58, shown separately in FIG. 8, has a relatively large diameter and has mounted integrally thereon an actuating arm assembly consisting of a pair of spaced-apart bifurcated actuating arms 60 which extend rearwardly from shaft 58 and a single bifurcated actuating link 62 which extends forwardly from shaft 58.

Each rod cap 54 is pivotally connected to an actuating arm 60 by means of a link pin 56 which passes through the bore of the rod cap 54. Link pin 56 is mounted in apertures formed in the arm members of actuating arm 60 and is fixed therein by retaining pin 64. Also extending between the arm members of actuating arm 60 is a hollow sleeve 66 which is seated in apertures in the arm members and is open at each end. Passing through sleeve 66 is a transverse lifting link 68 which extends through the inner wall 67 and middle wall 69 of lifting frame 32 and is retained therein by cotter pins 70, or similar retaining means.

A ram 72, preferably hydraulic, is vertically hung from a pivot pin 74 which is mounted between two support members 76 and 78 which in turn are mounted upon inner wall 80 of ram enclosure 24 and middle wall 82 respectively. Ram 72 is free to swing in an arc from front to rear within a slot cut in base plate 26, but not from side to side. Ram 72 is comprised of a cylinder 84, a reciprocating single acting piston 86, a piston rod 88 and a transversely bored piston rod connector 90 which receives pivot pin 74 and pivots thereon. It will be seen in FIG. 5 that actuation of the ram causes cylinder 84 to move downwardly while piston 86 remains stationary relative to pivot pin 74. The walls of the piston 86, which are lubricated, remain above the base plate 26 at all times so that foreign matter is prevented from accumulating thereon. The lower end of cylinder 84 has an integral connecting portion 92 which is transversely bored and is connected to actuating link 62 by means of link pin 94.

This complete the description of the ram and associated roller actuating mechanisms. It will be seen that introducing hydraulic fluid into the ram cylinder 84 below piston 86 forces the cylinder to move downwardly. The ram pivots on pin 74 in a rearward arc as actuating link 62 pivots about lower torque shaft 58 which is journalled in the stationary lower frame 28. Rotation of torque shaft 58 causes the spaced-apart bifurcated actuating arms 50 to pivot upwardly carrying with them lifting frames 32 which are pivotally connected to the actuating arms by transverse lifting links 68. It will be appreciated that, as the lifting frames 32 rise, link pins 56, which connect rod caps 54 to actuating arms 60, are thrust in an upward arc with respect to lifting links 68 so as to draw connecting rods 50 toward the front or main housing end of the truck as can be seen in a comparison of FIGS. 2 and 5.

Drawing the connecting rods 50 forward results in each fork roller 18 being pivoted downwardly about its axle 40. The location, lengths, and angular orientation of the various described components interact to cause the fork extensions 16 to be maintained in a continuous horizontal attitude throughout the lifting sequence.

To return the depressed fork rollers 18 to the retracted position shown in FIG. 2, a single, vertically disposed return spring 96 is provided. Return spring 96 is hung from a fixed pivot pin 98 mounted in middle wall 82 of ram enclosure 24. Like ram 72, return spring 96 is pivotable from front to rear and extends through a slot formed in base plate 26.

An upper torque shaft 100, shown in FIG. 6, is transversely positioned parallel to, slightly above and to the rear of lower torque shaft 58. Shaft 100 is journalled in lower frame 28. A pair of spaced-apart transversely bored lever arms 102 are mounted on upper torque shaft 100 and extend rearwardly. A single spring arm 104 is mounted on shaft 100 and extends forwardly. Spring arm 104 has a normally mounted finger 106 which extends inwardly and is peripherally grooved adjacent its free end for retaining the downward hook end 108 of return spring 96. Lever arms 102 are pivotally connected to lifting frames 32 by means of lowering links 110 which pass through sleeves 112 in lever arms 102. Lowering links 110 are seated in the middle walls 69 and outer walls 114 of the lifting frames 32.

When the fork rollers 18 are in the fully depressed position shown in FIG. 5, return spring 96 is fully extended and pivoted toward the front of the truck. As the hydraulic pressure is released in the ram 72, return spring 96 pulls upwardly on finger 106 and spring arm 104. This causes the pair of lever arms 102 to be revolved downwardly thereby lowering the lifting frames 32 to which each lever arm is linked. As the lifting frames 32 descend, actuating arms 60, which are linked to the lifting frames, are downwardly pivoted about lower torque shaft 58. Actuating link 62 is upwardly pivoted which raises cylinder 84 telescopically over piston 86.

As the lifting frames 32 are lowered, each connecting rod 50 is thrust longitudinally toward fork roller 18 by virtue of the downward angular rotation of link pin 56 about lifting link 68 which is mounted in the walls of lifting frame 32. The rearward movement of the connecting rod 50 causes the stabilizing wheel axle 46 to pivot upwardly about roller support bracket axle 40 thereby raising and retracting roller support bracket 38 and fork roller 18 into fork extension 16 as shown in FIG. 2. It will be understood that at all times the fork extensions 16 are in a horizontal plane.

It will be observed that the two large shafts 58 and 100 are journalled in the lower frame 28 and are therefore stationary, excepting rotational movement. The lifting links 68 and lowering links 110 are mounted in the lifting frames 32 and move therewith. Thus, the first of the two primary motions of the novel mechanism is the pivoting of the ram and spring driven arms about shafts 58 and 100 to raise and lower the lifting frames 32 and the forward portion of the fork extensions 16 affixed thereto.

The second primary motion is that of the connecting rods 50. The forward ends of the connecting rods are pivoted on link pins 56 mounted in the actuating arms 60. The pinned rod ends pivot about lifting links 68, mounted in the lifting frames 32, to alternately push and pull the connecting rods 50 along the fork extensions 16. The other ends of the connecting rods 50 are connected to axles 46 to pivotally lower and retract the fork roller assembly and the rear portion of the fork extensions 16.

Thus, it can be seen that the interaction of these two primary motions causes the front and rear ends of the fork extensions 16 to be equally raised and lowered, assuring that the palletized load will be maintained in a horizontal attitude at all times.

*Operation*

To operate a materials handling truck, such as that shown in the drawings, the operator stands at the front of the truck and grips the control handle 14. The load to be moved is secured on an open faced pallet having upper and lower spaced-apart slats. The operator maneuvers fork extensions 16, in which fork rollers 18 are retracted, into the pallet until stop plate 30 strikes the pallet edge. The operator then actuates the hydraulic system to depress rollers 18 thereby raising fork extensions 16. This lifts the pallet from the floor allowing the truck to be driven to the unloading location.

Actuation of the hydraulic system causes ram 72 to move downwardly thereby pivoting actuating link 62 and actuating arms 60 on shaft 58. This raises lifting frames 32, during the process of which link pins 56 pivot upwardly about lifting links 68. Connecting rods 50, which are pivotally attached to link pins 56, are drawn forwardly (toward lifting frames 32) causing roller support brackets 38 and their associated fork rollers 18 to be pivoted downwardly about roller support bracket axle 40. The fork rollers 18 pass downwardly between the lower pallet slats to raise the fork extensions 16 and the palletized load mounted thereon. The rollers 18 provide rolling support for truck travel.

After arriving at the unloading area, the operator releases the pressure in the hydraulic system allowing the fork rollers 18 to rise to a retracted position within fork extensions 16. The retracting power is generated by return spring 96 which was extended during ram actuation and fork roller depression. As return spring 96 pulls upwardly, spring arm 104 and lever arms 102 pivot on upper shaft 100 thereby lowering lifting frames 32. Lifting links 68, mounted in the descending lifting frames, pivot actuating arms 60 downwardly on shaft 58 thereby pivotally raising actuating link 62 and telescopically returning ram 72 to its non-actuated position. Link pins 56 arc downwardly about lifting links 68 as lifting frames 32 descend. This motion thrusts connecting rods 50 rearwardly to upwardly pivot stabilizing wheel axles 46 about roller support bracket axles 40. This retracts roller support brackets 38 and fork rollers 18 into fork extensions 16 so that the fork extensions can be withdrawn from the pallet to complete the unloading sequence.

Obviously, many modifications and variations of the present invention are possible in the light of the above teachings. Therefore, it is to be understood that the invention is not limited in its application to the details of the construction and arrangement of parts specifically described or illustrated, and that within the scope of the appended claims, it may be practiced otherwise than as specifically described or illustrated.

We claim:

1. Means for raising and lowering the fork extensions of a materials handling truck having a main housing frame and a fork extension lifting frame vertically movable with respect to said main housing frame, said means comprising; a transverse shaft journalled in said main frame; an actuating arm mounted on said shaft for rotation therewith, said actuating arm pivotally connected to said lifting frame; a vertically pivotable roller carrier mounted in each said fork extension carrying a roller mounted for rotation therein; a connecting rod longitudinally movable within each said fork extension being pivotally attached at one end thereof to said roller carrier and being pivotally attached at its other end to said actuating arm at a point on said arm spaced from the lifting frame pivotal connection point; a ram mounted within said main housing frame operably engaging said transverse shaft for rotation of said shaft-mounted actuating arm to raise said lifting frame and, simultaneously, to lower said roller carriers; and means for rotating said shaft-mounted actuating arm in the reverse direction to lower said lifting frame and, simultaneously, to raise said roller carriers.

2. Means for raising and lowering the fork extensions of a materials handling truck having a main housing frame and a fork extension lifting frame vertically movable with respect to said main housing frame, said means comprising; a vertically positioned piston-cylinder assembly pivotally mounted within said main frame; a transverse shaft journalled in said main housing frame; actuating arms mounted for rotation on said transverse shaft linking said piston-cylinder assembly with said fork extension lifting frame; vertically pivotable rollers in said fork extensions; connecting rods longitudinally movable within said fork extensions engaging said pivotable rollers and said actuating arms whereby actuation of said piston-cylinder assembly rotates said actuating arms to raise said fork extension lifting frame and to longitudinally draw said connecting rods to downwardly pivot said fork extension rollers thereby raising said fork extensions; and spring means cooperating with said piston-cylinder assembly for reversing the actuation cycle thereby lowering said fork extensions, said spring means including, a second transverse shaft journalled in said main housing frame; lever arms mounted on said second shaft for rotation therewith, at least one of said lever arms pivotally engaging said fork extension lifting frame; and a vertically positioned return spring pivotally mounted at its upper end on said main frame and linked at its lower end to another of said lever arms whereby said spring means exerts continuous downward pressure on said fork extension lifting frame and corresponding upward pressure on said piston-cyclinder assembly.

3. Means for raising and lowering the fork extensions of a materials handling truck having a main housing frame and a fork extension lifting frame vertically movable with respect to said main housing frame, said means comprising; a vertically positioned piston-cylinder assembly pivotally mounted within said main frame; a vertically positioned return spring pivotally mounted within said main frame adjacent said piston-cylinder assembly; a first transverse shaft journalled in said main frame, said shaft having normally positioned actuating arms mounted for rotation thereon, said actuating arms linked to said fork extension lifting frame and to said piston-cylinder assembly; fork rollers in said fork extensions, said fork rollers arranged to be downwardly pivoted; connecting rods longitudinally movable in said fork extensions, said connecting rods engaging said fork rollers and said actuating arms whereby downward actuation of said piston-cylinder assembly rotates said actuating arms to raise said fork extension lifting frame and to draw said connecting rods to downwardly pivot said fork rollers causing said fork extensions to raise horizontally; and a second transverse shaft journalled in said main housing frame, said second shaft having normally positioned lever arms mounted for rotation thereon, said lever arms linked to said fork extension lifting frame and to said return spring whereby cessation of the actuating force of the piston-cylinder assembly permits said return spring to rotate said lever arms to lower said fork extension lifting frame and to thrust said connecting rods to upwardly pivot said fork rollers causing said fork extensions to lower horizontally.

4. The apparatus of claim 3 wherein said piston-cylinder assembly has its piston end pivotally pinned to said main housing frame.

5. The apparatus of claim 4 further characterized by a horizontal base plate mounted in said main housing frame below the piston portion of the piston-cylinder assembly.

References Cited by the Examiner

UNITED STATES PATENTS

| | | | |
|---|---|---|---|
| 2,598,151 | 5/1952 | Warshaw | 280—43.12 |
| 2,615,677 | 10/1952 | Quayle | 280—43.12 |
| 2,693,339 | 11/1954 | Quayle | 254—8 |
| 2,734,752 | 2/1956 | Boylan et al. | 254—2 |

BENJAMIN HERSH, *Primary Examiner.*

C. C. PARSONS, *Assistant Examiner.*